Patented Jan. 18, 1927.

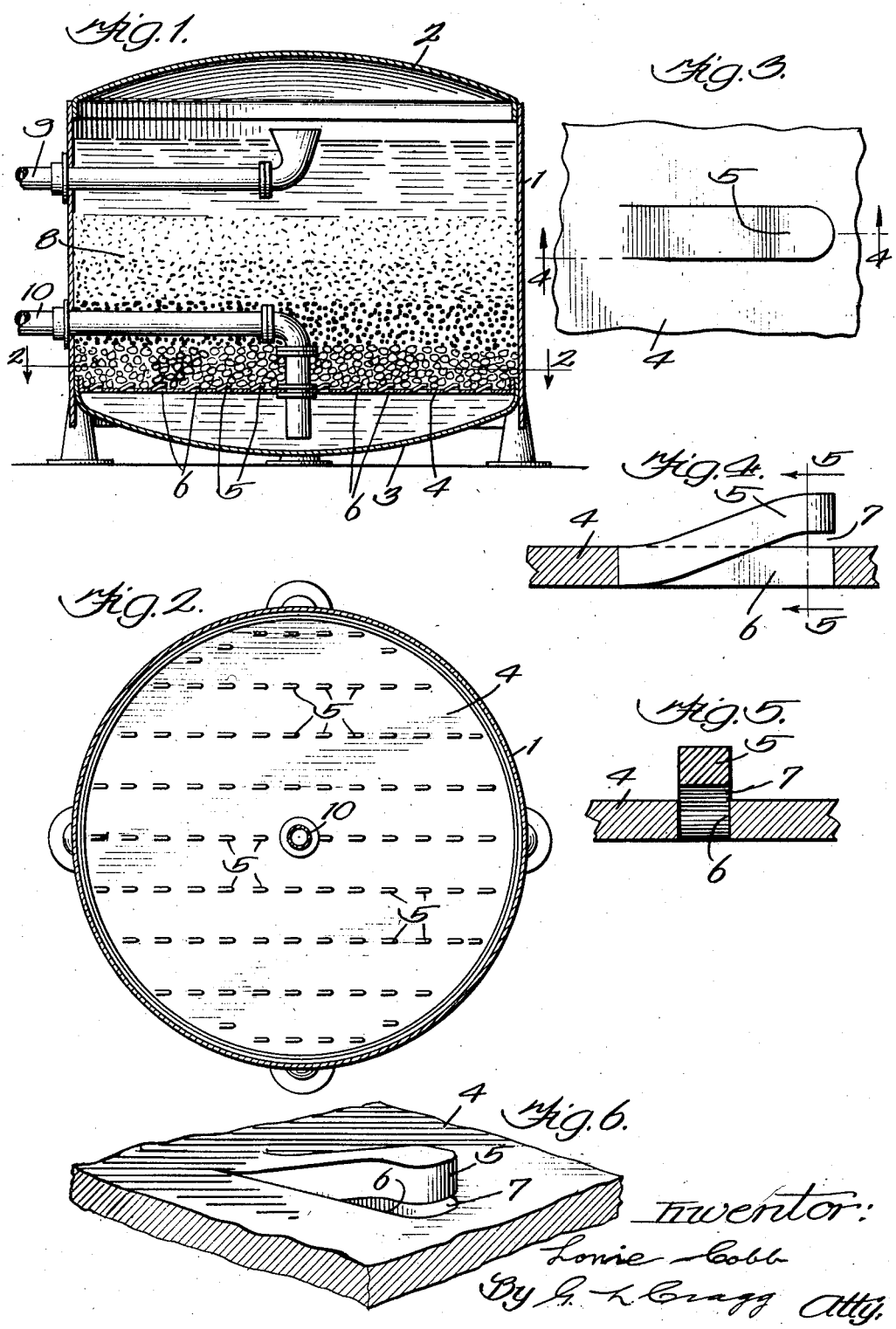

1,615,071

UNITED STATES PATENT OFFICE.

LONIE COBB, OF HAMMOND, INDIANA, ASSIGNOR TO GRAVER CORPORATION, OF EAST CHICAGO, INDIANA, A CORPORATION OF ILLINOIS.

FILTERING TANK.

Application filed May 6, 1926. Serial No. 107,070.

My invention relates to tanks employing plates for supporting filtering or other media within the tanks through which liquid is to pass and having openings formed therethrough for the passage of liquid.

My invention resides in providing guards that are preferably in the form of tongues which are carried by the medium supporting plate of such a tank, each tongue having a portion unconnected with the plate and in register with an opening and being spaced apart from the plate to afford a passage communicating with said opening between the plate and tongue. In the preferred embodiment of the invention the tongues are integrally formed with the plates by being struck therefrom, each tongue having an unconnected portion spaced apart from the medium supporting plate to an extent to afford a passage communicating with said opening between the plate and tongue that is narrower than the opening. In the case of filters the portion of the filtering medium directly overlying the filtering plate is desirably composed of gravel that is too large to enter the spaces between the tongues and plate so that the openings in the plate for the passage of the liquid may not be clogged by the filtering medium.

I will explain my invention more fully by reference to the accompanying drawing in which Fig. 1 is a sectional elevation of a filtering tank equipped in accordance with the preferred embodiment of the invention; Fig. 2 is a sectional plan view on line 2—2 of Fig. 1; Fig. 3 is a plan view, on a larger scale, of a portion of the filtering plate; Fig. 4 is a sectional view on line 4—4 of Fig. 3; Fig. 5 is a sectional view on line 5—5 of Fig. 4; and Fig. 6 is a perspective view of the portion shown in Fig. 3.

The tank 1 is provided with top and bottom walls 2 and 3 and a plate 4 at the bottom of the tank a short distance above the tank bottom. The plate has guards 5, preferably in the form of tongues which are struck upwardly therefrom, each tongue having a portion unconnected with the plate and overlying and in register with the opening 6 left in the plate due to the formation of the tongue and spaced apart from the plate to an extent to afford a passage 7 communicating with said opening between the plate and tongue that is narrower than the opening. In the case of a filter, the filtering medium 8 is preferably graded from sand at the top to coarse gravel at the filtering plate, this gravel being of such size that it cannot enter the spaces 7 whereby the openings 6 will not become clogged. The liquid to be treated is received through a supply pipe 9 which discharges into the space between the top of the tank and the filtering or other medium, and passes downwardly through this medium and through the passages 7 and openings 6 into the space between the medium supporting plate and the bottom of the tank from whence it may be withdrawn for use in filtered or treated condition through the pipe 10. The medium upon the plate 4 may be cleansed by causing cleansed or softened water to pass upwardly through the plate and the medium thereon.

Having thus described my invention, I claim:—

1. A tank having a plate in supporting relation to a liquid treating medium within the tank and having guards struck therefrom, each guard having a portion unconnected with the plate in register with the opening left in the plate due to the formation of the guard and being spaced apart from the plate to an extent to afford a passage communicating with said opening between the plate and guard that is narrower than the opening.

2. A tank having a plate in supporting relation to a liquid treating medium within the tank and having guards struck therefrom, each guard having a portion unconnected with the plate in register with the opening left in the plate due to the formation of the guard and being spaced apart from the plate to afford a passage communicating with said opening between the plate and guard.

3. A tank having a plate in supporting relation to a liquid treating medium within the tank and carrying guards, each guard having a portion unconnected with the plate in register with an opening and being spaced apart from the plate to an extent to afford a passage communicating with said opening between the plate and guard that is narrower than the opening.

4. A tank having a plate in supporting relation to a liquid treating medium within the tank and carrying guards, each guard having a portion unconnected with the plate in register with an opening and being spaced apart from the plate to afford a passage communicating with said opening between the plate and guard.

In witness whereof, I hereunto subscribe my name.

LONIE COBB.